US009573587B2

(12) United States Patent
Hata et al.

(10) Patent No.: US 9,573,587 B2
(45) Date of Patent: Feb. 21, 2017

(54) DRIVE CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Kensei Hata, Shizuoka-ken (JP); Yuji Iwase, Mishima (JP); Yosuke Suzuki, Hadano (JP); Akiko Nishimine, Toyota (JP); Sohei Murata, Chiryu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/879,605

(22) Filed: Oct. 9, 2015

(65) Prior Publication Data
US 2016/0101776 A1    Apr. 14, 2016

(30) Foreign Application Priority Data
Oct. 14, 2014   (JP) .................. 2014-210075

(51) Int. Cl.
| | |
|---|---|
| B60K 1/02 | (2006.01) |
| B60W 20/00 | (2016.01) |
| B60W 10/08 | (2006.01) |
| B60W 10/105 | (2012.01) |
| B60K 6/365 | (2007.10) |

(52) U.S. Cl.
CPC .............. B60W 20/40 (2013.01); B60K 6/365 (2013.01); B60W 10/08 (2013.01); B60W 10/105 (2013.01); B60W 2510/107 (2013.01); Y10S 903/91 (2013.01); Y10S 903/93 (2013.01)

(58) Field of Classification Search
CPC .... B60W 20/40; B60W 10/08; B60W 10/105; B60W 2510/107; B60K 6/365
See application file for complete search history.

(56) References Cited

U.S. PATENT DOCUMENTS

| | | | | |
|---|---|---|---|---|
| 5,788,006 | A | 8/1998 | Yamaguchi | |
| 6,722,456 | B2 * | 4/2004 | Hisada | B60K 6/445 180/65.235 |
| 7,565,938 | B2 * | 7/2009 | Hisada | B60K 6/445 180/65.1 |
| 7,694,762 | B2 * | 4/2010 | Supina | B60K 6/365 180/65.25 |

(Continued)

FOREIGN PATENT DOCUMENTS

| | | |
|---|---|---|
| JP | H08-295140 A | 11/1996 |
| JP | 2016-078551 A | 5/2016 |

(Continued)

*Primary Examiner* — David J Hlavka
(74) *Attorney, Agent, or Firm* — Andrews Kurth Kenyon LLP

(57) ABSTRACT

A drive control system includes a power split mechanism, a brake mechanism, a first motor, an output member, a second motor and an electronic control unit. The electronic control unit is configured to; obtain at least one of a first time that is a duration of a motor driven state or a second time that is a duration of a state where the motor driven state is ended, estimate a temperature of the power split mechanism based on at least one of the first time or the second time, and allow or inhibit the motor driven state in accordance with a temperature of the power split mechanism, the first time, or the second time.

4 Claims, 10 Drawing Sheets

(56) References Cited

U.S. PATENT DOCUMENTS

| | | | |
|---|---|---|---|
| 8,594,876 B2 * | 11/2013 | Takami | F02D 29/02 701/22 |
| 2011/0230292 A1 | 9/2011 | Komatsu et al. | |
| 2016/0101771 A1 | 4/2016 | Hata et al. | |
| 2016/0101773 A1 | 4/2016 | Hata et al. | |

FOREIGN PATENT DOCUMENTS

| | | |
|---|---|---|
| JP | 2016-078552 A | 5/2016 |
| WO | 2011/114785 A1 | 9/2011 |

* cited by examiner

F I G . 3
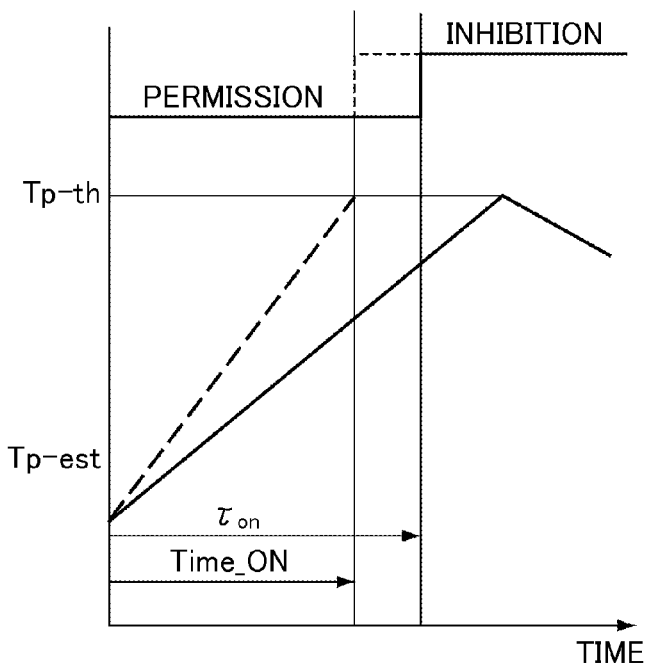
F I G . 4
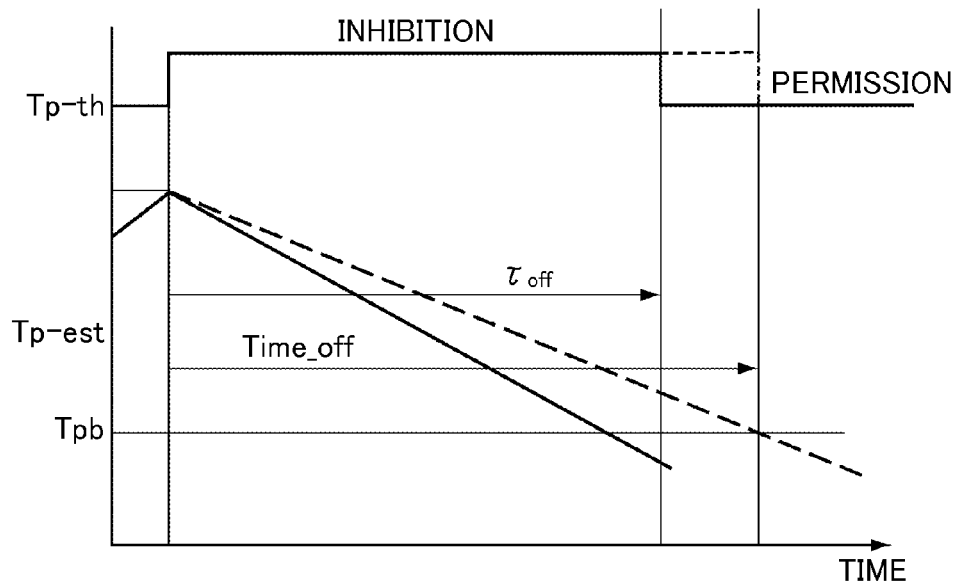

DRIVE CONTROL SYSTEM FOR HYBRID VEHICLE

INCORPORATION BY REFERENCE

The disclosure of Japanese Patent Application No. 2014-210075 filed on Oct. 14, 2014 including the specification, drawings and abstract is incorporated herein by reference in its entirety.

BACKGROUND OF THE INVENTION

1. Field of the Invention

The invention relates to a control system for a hybrid vehicle that uses a motor, which is used to control the rotation speed of an engine, as a driving force source that outputs driving force for propelling the hybrid vehicle.

2. Description of Related Art

A so-called two-motor hybrid vehicle is described in Japanese Patent Application Publication No. 8-295140 (JP 8-295140A). The hybrid vehicle includes a power split mechanism formed of a planetary gear mechanism. Torque output from an engine is input to a carrier of the planetary gear mechanism, and a first motor having a power generating function is coupled to a sun gear of the planetary gear mechanism. A ring gear is an output element of the planetary gear mechanism. The ring gear is coupled to a differential via a counter gear unit that constitutes a speed reduction mechanism. A second motor is coupled to the counter gear unit. Electric motor generated by the first motor is allowed to be supplied to the second motor. In addition, a brake that stops rotation of an input shaft coupled to the carrier is provided. In a state where the carrier is fixed by engaging the brake, the power split mechanism functions as a speed reduction mechanism, and is able to amplify torque output from the first motor and output the amplified torque from the ring gear.

International Application Publication No. 2011/114785 describes a system having a similar configuration to that of the hybrid drive system described in JP 8-295140 A. In the drive system of this type, for example, if a vehicle is towed in a state where an engine is stopped, because a carrier is stopped, there is a possibility that it becomes insufficient to supply lubricating oil to pinion gears, pinion pins, and the like. In the system described in International Application Publication No. 2011/114785, a receiver that receives lubricating oil falling from a liquid pool portion provided above a planetary gear mechanism and then guides the received lubricating oil to the pinion pins is provided.

In the hybrid vehicle described in JP 8-295140A, when the engine is stopped and rotation of the carrier is stopped by the brake, the power split mechanism serves as a speed reducer. When the first motor is caused to function as a motor in this state, torque of the first motor is amplified and output from the ring gear, so it is possible to propel the hybrid vehicle. In this case, because the carrier does not dip lubricating oil, there arises a situation that it is not possible to sufficiently supply lubricating oil to the pinion gears, the pinion pins, and the like, as described in International Application Publication No. 2011/114785.

The system described in International Application Publication No. 2011/114785 is configured to guide lubricating oil falling from the liquid pool portion provided above the planetary gear mechanism to the pinion pins or the pinion gears. Therefore, when lubricating oil is sufficiently pooled in the liquid pool portion, it is possible to supply lubricating oil to the pinion pins, the pinion gears, and the like. However, for example, when lubricating oil in the liquid pool portion runs dry or does not sufficiently fall because of high-viscosity lubricating oil, there is a possibility of insufficient lubrication of the pinion pins, the pinion gears, and the like. Because it is required to provide the above-described liquid pool portion, it is required to significantly modify an existing system, and there is a possibility that the size of the overall configuration of the hybrid system increases.

SUMMARY OF THE INVENTION

The invention provides a drive control system that is able to suppress a decrease in the durability of a planetary gear mechanism that constitutes a power split mechanism and also to execute a drive mode, in which a motor coupled to the power split mechanism is used as a driving force source for propelling a vehicle, for a long period of time as much as possible.

A drive control system related to the present invention is for a hybrid vehicle. The drive control system includes a power split mechanism, a brake mechanism, a first motor, an output member, a second motor, an electronic control unit. The power split mechanism includes a carrier, a sun gear and a ring gear as rotating elements. The power split mechanism is configured to carry out differential action, a torque output from an engine being transmitted to the carrier. The brake mechanism is configured to selectively stop rotation of the carrier. The first motor is coupled to one of the sun gear and the ring gear, the first motor being able to generate an electric power. The output member is coupled to the other one of the sun gear and the ring gear. The second motor is configured to add a driving torque for propelling the hybrid vehicle to a torque of the output member. The electronic control unit is configured to obtain at least one of a first time that is a duration of a motor driven state or a second time that is a duration of a state where the motor driven state is ended. The electronic control unit is configured to estimate a temperature of the power split mechanism based on at least one of the first time or the second time. The electronic control unit is configured to allow or inhibit the motor driven state in accordance with following condition i) and condition ii) or following condition i) and condition iii): i) allow the motor driven state when a first temperature is lower than a predetermined first threshold or when a second temperature is lower than a predetermined second threshold; ii) allow the motor driven state when the first temperature is higher than or equal to the first threshold and the first time is shorter than or equal to a predetermined first reference time, and inhibit the motor driven state when the first temperature is higher than or equal to the first threshold and the first time exceeds the first reference time; and iii) allow the motor driven state when the second temperature is higher than or equal to the second threshold and the second time is longer than or equal to a predetermined second reference time, and inhibit the motor driven state when the second temperature is higher than or equal to the second threshold and the second time is shorter than the second reference time. The first temperature is a temperature of the power split mechanism, estimated based on the first time. The second temperature is a temperature of the power split mechanism, estimated based on the second time. The motor driven state is a state that satisfies all the following conditions iv) to vi): iv) rotation of the carrier is stopped by the brake mechanism; v) a torque output from the first motor is transmitted to the output member via the power split mechanism; and vi) the second motor is outputting the driving torque.

With the above configuration, when the motor driven state is established, the duration of the motor driven state is obtained. Alternatively, when the motor driven state is ended, an elapsed time from the end, that is, the duration of the state where the motor driven state is ended, is obtained. The temperature of the power split mechanism is estimated on the basis of one of these durations. When the estimated temperature is lower than the first or second threshold, the motor driven state is allowed; whereas, when the estimated temperature is higher than or equal to the first or second threshold, the motor driven state is inhibited or allowed in response to the duration of the motor driven state or the duration of the state where the motor driven state is ended. That is, even when the estimated temperature is higher than or equal to the first or second threshold, but when a time that is presumably required for the temperature to rise has not elapsed or when a time required for the temperature to sufficiently decrease has elapsed, the motor driven state is allowed irrespective of the estimated temperature. Therefore, when it is estimated that there is an abnormality in estimation of the temperature, the hybrid vehicle is not limited by the estimated temperature and is able to travel in the motor driven state, so a period or an opportunity for the motor driven state increases, and it is possible to improve fuel economy.

The electronic control unit may be configured to, when the motor driven state is intermitted and a time of an intermission is shorter than a predetermined time, keep determination that the motor driven state is established.

Further, the electronic control unit may be configured to estimate the temperature of the power split mechanism (4) based on the first time and a predetermined rate of rise in the temperature.

With the above configuration, when the motor driven state is temporarily intermitted and the intermission time is shorter than the predetermined time, counting of the time during which the motor driven state is established is continued without intermission. This reduces a deviation in the correlation between the temperature of the power split mechanism, which is raised as a result of the motor driven state, and the count value of the duration. As a result, it is possible to prevent or suppress an excessive rise in the temperature of the pinion gears, pinion pins, and the like, which are supported by the carrier, or a decrease in the durability thereof.

The electronic control unit may be configured to estimate the temperature of the power split mechanism based on the second time and a predetermined rate of decrease in the temperature.

With the above configuration, the temperature is estimated on the basis of each of the above-described elapsed times and the predetermined rate of rise or rate of decrease in the temperature, so it is not necessary to use a sensor that detects the temperature of the power split mechanism, and it is possible to estimate the temperature with accuracy to a certain degree.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a schematic view for illustrating the timing of inhibition in the case where there is an abnormality in estimating the pinion temperature in process in which the pinion temperature rises;

FIG. 4 is a schematic view for illustrating the timing of permission in the case where there is an abnormality in estimating the pinion temperature in process in which the pinion temperature decreases;

DETAILED DESCRIPTION OF EMBODIMENTS

Figure 5:
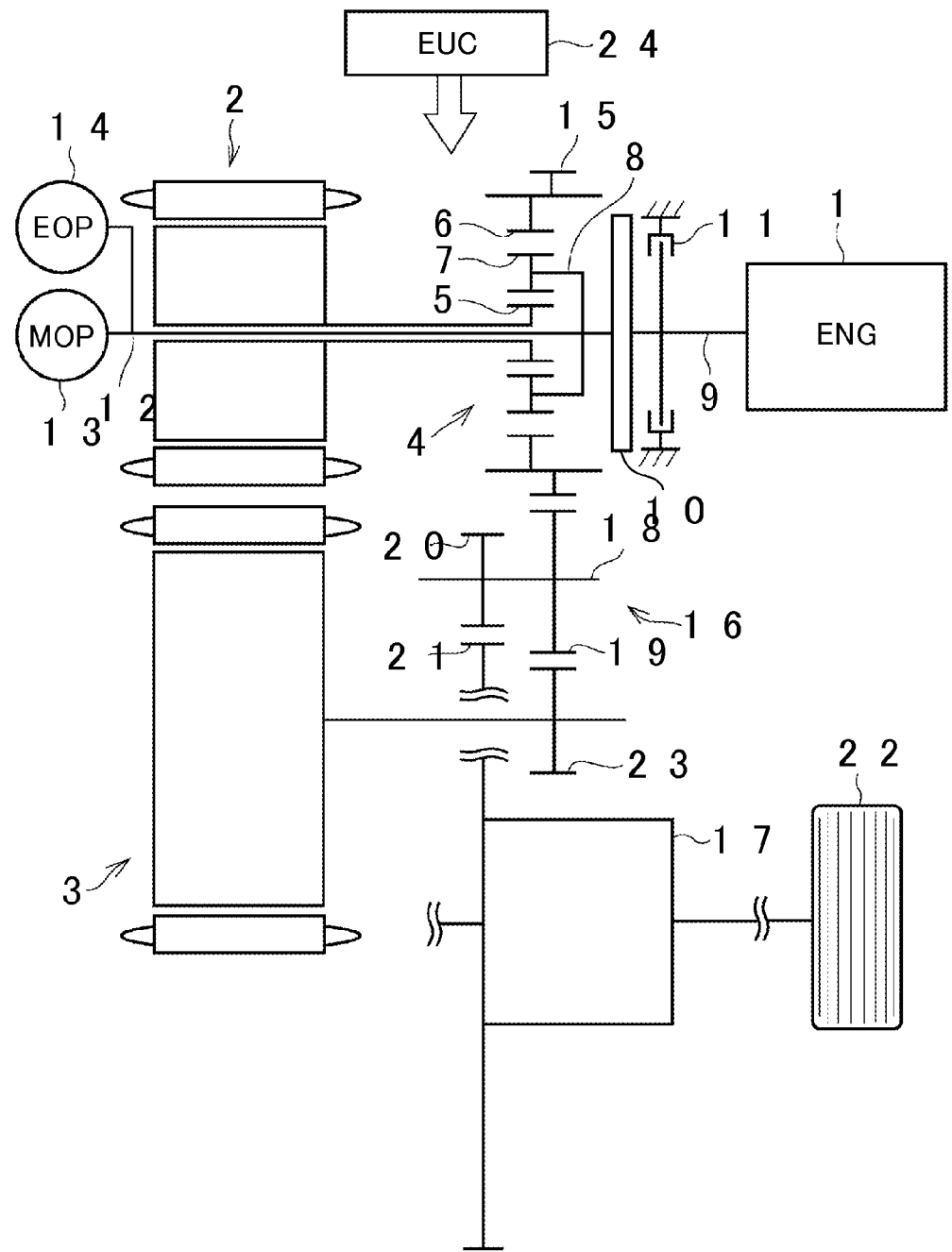
FIG. 5 is a skeletal view that shows an example of a drive line in a hybrid vehicle to which the invention is applicable.

FIG. 5 shows a skeletal view of a hybrid vehicle to which the invention is applicable. A hybrid drive system is a so-called two-motor drive system, and includes an engine (ENG) 1 and two motors 2, 3 as driving force sources. The engine 1 is an internal combustion engine, such as a gasoline engine and a diesel engine. The first motor 2 may be a motor generator (MG) that is able to regenerate energy and output power. In addition, the second motor 3 may be similarly a motor generator (MG). A power split mechanism 4 is provided. The power split mechanism 4 distributes power output from the engine 1 to the first motor 2 and an output member. The power split mechanism 4 may be formed of a differential mechanism, such as a planetary gear mechanism. In the example shown in FIG. 5, the power split mechanism 4 is formed of a single-pinion planetary gear mechanism. A plurality of (for example, three) pinion gears 7 are arranged between a sun gear 5 and a ring gear 6. The plurality of pinion gears 7 are in mesh with these sun gear 5 and ring gear 6. Those pinion gears 7 are supported by a carrier 8 so as to be rotatable and revolvable. A structure of supporting the pinion gears 7 by the carrier 8 is similar to the structure in the generally known planetary gear mechanism.

The structure will be simply described. Pinion pins are supported by the carrier 8. The pinion gears 7 are respectively fitted to the pinion pins via bearings, such as needle bearings, provided on the outer peripheral sides of the pinion pins. Each of the pinion pins has an oil hole along its central axis. Another oil hole extends from each oil hole to the outer periphery. Lubricating oil is supplied to the bearings and tooth flanks via these oil holes.

The carrier 8 is a so-called input element. Power from the engine 1 is transmitted to the carrier 8. That is, an output shaft (crankshaft) 9 of the engine 1 and the carrier 8 are coupled to each other via a damper mechanism 10. A brake mechanism 11 is provided between the carrier 8 and the engine 1. The brake mechanism 11 selectively stops rotation of the carrier 8. The brake mechanism 11 may be any one of a friction brake, a dog brake and a one-way clutch.

The first motor 2 is arranged along the same axis as the power split mechanism 4 across the power split mechanism 4 from the engine 1. The first motor 2 is coupled to the sun gear 5. Therefore, the sun gear 5 is a so-called reaction element. A rotor shaft of the first motor 2 and a sun gear shaft to which the rotor shaft is coupled are hollow shafts. A pump shaft 12 is inserted inside the hollow shafts. One end of the pump shaft 12 is coupled to the engine 1. An oil pump (mechanical oil pump (MOP)) 13 is coupled to the other end of the pump shaft 12. The MOP 13 is driven by the engine 1 to generate hydraulic pressure for control and hydraulic pressure for lubrication. Therefore, a second oil pump (electric oil pump (EOP)) 14 is provided in parallel with the MOP 13. The second oil pump 14 is driven by a motor in order to ensure hydraulic pressure at the time when the engine 1 is stopped.

The ring gear 6 in the planetary gear mechanism that constitutes the power split mechanism 4 is a so-called output element. An output gear 15 is integrally provided with the ring gear 6. The output gear 15 is an external gear corresponding to the output member in the embodiment of the invention. The output gear 15 is coupled to a differential gear 17 via a counter gear unit 16. That is, a driven gear 19 connected to a counter shaft 18 is in mesh with the output gear 15. A drive gear 20 having a smaller diameter than the driven gear 19 is connected to the counter shaft 18. The drive gear 20 is in mesh with the ring gear 21 in the differential gear 17. A driving force is output from the differential gear 17 to right and left drive wheels 22. Another drive gear 23 is in mesh with the driven gear 19. The second motor 3 is coupled to the drive gear 23. That is, torque of the second motor 3 is added to torque that is output from the output gear 15.

The first motor 2 and the second motor 3 are electrically connected to each other via an electrical storage device (not shown) or an inverter (not shown), and are configured to be able to supply electric power generated by the first motor 2 to the second motor 3.

The above-described hybrid vehicle is able to selectively set one of three drive modes, that is, a hybrid mode (HV mode), a two-motor mode and a one-motor mode. The HV mode is a drive mode in which power output from the engine 1 is distributed by the power split mechanism 4 to the first motor 2 side and the output gear 15 side, electric power generated by the first motor 2 functioning as a power generator is supplied to the second motor 3, and the output torque of the second motor 3 is added to the torque of the output gear 15 in the counter gear unit 16. The two-motor mode is a mode in which the first motor 2 and the second motor 3 are operated as driving force sources for propelling the hybrid vehicle, and the hybrid vehicle travels by the use of the power of these two motors 2, 3. In this case, the carrier 8 is fixed by the brake mechanism 11. Therefore, the power split mechanism 4 functions as a speed reduction mechanism between the first motor 2 and the output gear 15. A state where the hybrid vehicle is traveling in the two-motor mode corresponds to a motor driven state according to the embodiment of the invention. The one-motor mode is a mode in which the hybrid vehicle travels by using the second motor 3 as a driving force source. A state where the hybrid vehicle is stopped, a state where the hybrid vehicle is traveling in the HV mode or a state where the hybrid vehicle is traveling in the one-motor mode corresponds to a state where a motor running state is ended according to the embodiment of the invention.

Figure 6:
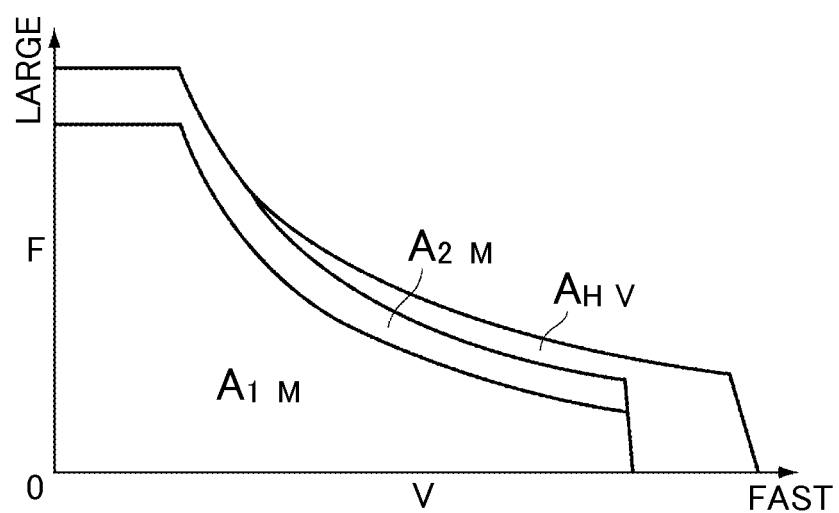
FIG. 6 is a map that shows an example of regions of an HV mode, a two-motor mode and a one-motor mode.

Driving torque, fuel economy, and the like, are different from one another among these drive modes, so regions of those drive modes are determined by a vehicle speed, a driving force, and the like, and the drive mode is selected on the basis of a required driving force, represented by an accelerator operation amount, and a vehicle speed. FIG. 6 shows the regions of the drive modes, determined in advance by a vehicle speed V and a driving force F. In FIG. 6, the region indicated by the sign AHV is the HV mode region, the region indicated by the sign A2M is the two-motor mode region, and the region indicated by the sign A1M is the one-motor mode region. An electronic control unit (ECU) 24 is provided as a controller for selecting any one of these drive modes and controlling the units of the hybrid drive system such that the selected drive mode is established. The ECU 24 is mainly formed of a microcomputer. The ECU 24 is configured to perform a computation on the basis of input data and data, such as a prestored map, and output the computed result as a control command signal to the engine 1, each of the motors 2, 3, the electrical storage device or the inverter for the motors 2, 3, the brake mechanism 11, or the like. Examples of data that are input to the ECU 24, that is, data that are used in control, include the vehicle speed, the accelerator operation amount, the rotation speeds of the motors 2, 3, the driving currents of the motors 2, 3, the temperature (oil temperature) of lubricating oil), the on/off state of an ignition switch of the hybrid vehicle, the open/closed state of a grill shutter provided at the front face of a vehicle body, the duration of the open state or closed state of the grill shutter, the temperature (ambient temperature) of an environment in which the hybrid vehicle is placed, and the like. The above-described regions shown in FIG. 2, the rate of rise and rate of decrease in the temperature of the pinion gears, pinion pins, or the like, the initial value of the temperature, determination thresholds for time and temperature, and the like, are stored in advance.

Figure 1A:
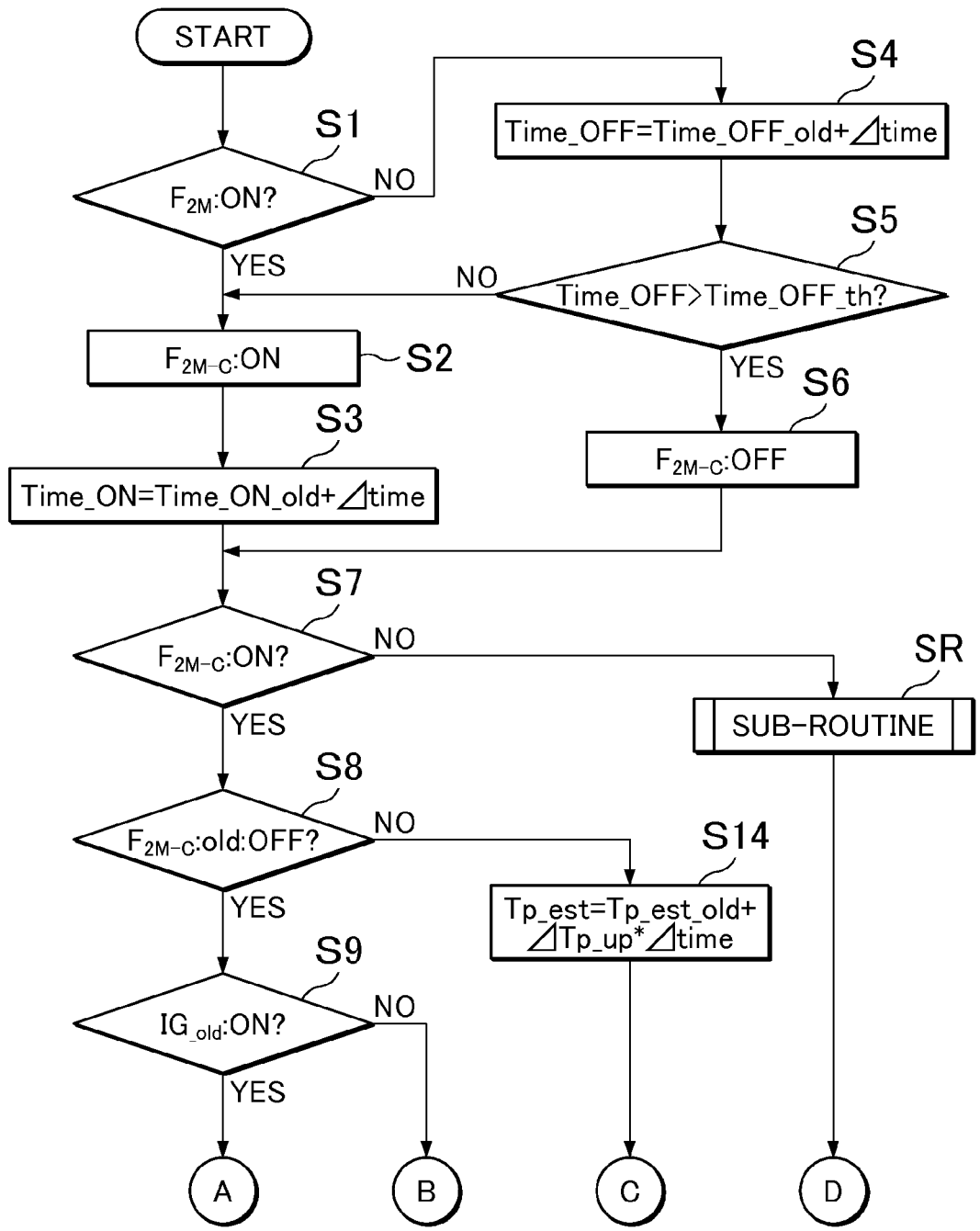
FIG. 1A and FIG. 1B are flowcharts that illustrate an example of control in process in which a pinion temperature rises within control that is executed by a controller in a control system according to the invention.
Figure 1B:
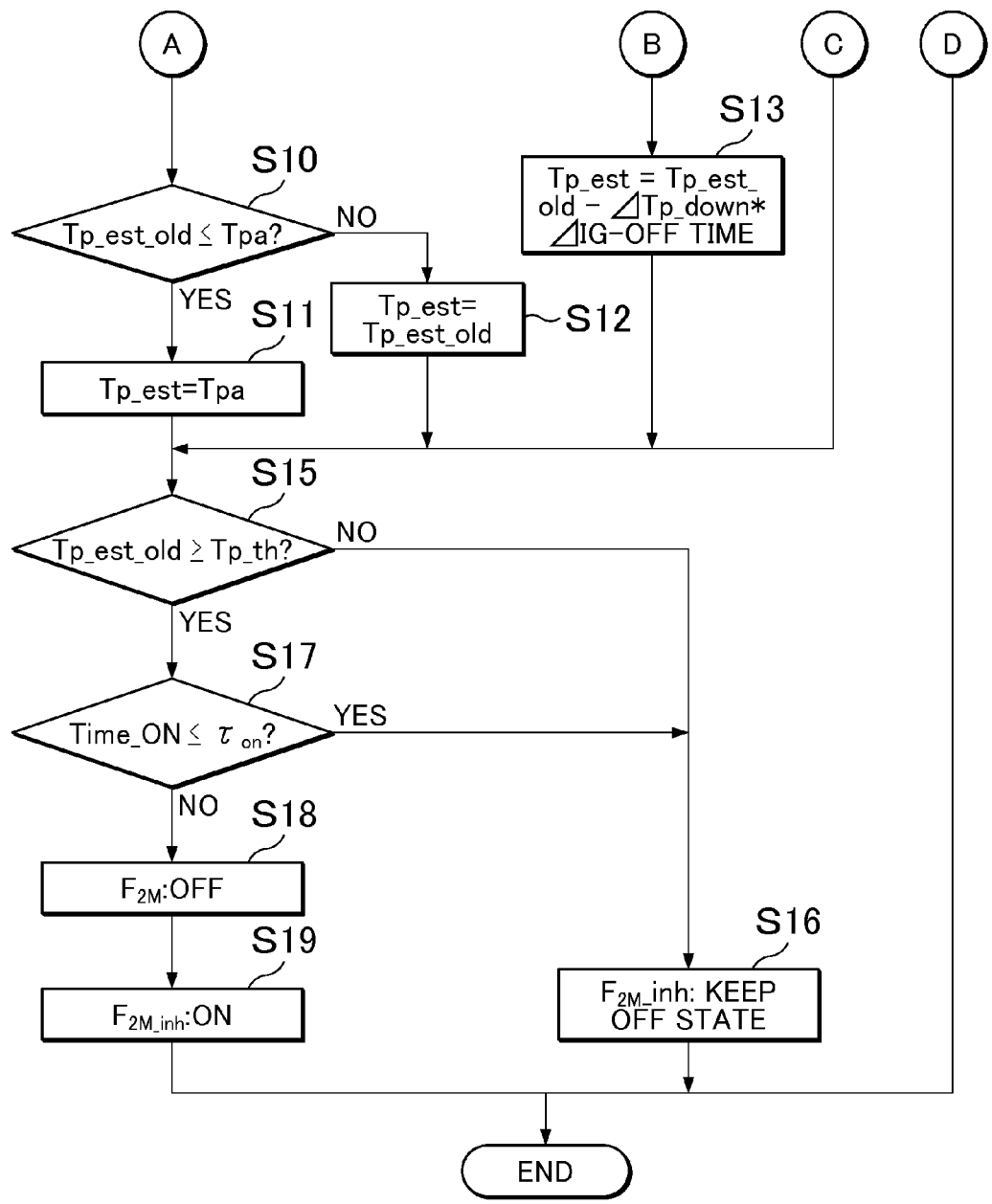

The drive control system according to the invention is configured to execute the two-motor mode for a long period of time as much as possible within the range in which the temperature of the above-described pinion gears, pinion pins, and the like, does not excessively rise. The temperature of the power split mechanism is a temperature related to the power split mechanism, and includes the temperature of the pinion gears, pinion pins, and the like. The drive control system is configured to estimate the temperature related to the power split mechanism on the basis of a time. An example of control for the above is shown by the flowcharts in FIG. 1A and FIG. 1B. The controller according to the embodiment of the invention is configured to execute this flowchart. The routine shown in FIG. 1A and FIG. 1B is repeatedly executed at predetermined short time intervals while the hybrid vehicle is traveling. In the control example shown in FIG. 1A and FIG. 1B, initially, it is determined whether a flag (hereinafter, temporarily referred to as two-motor flag) F2M indicating that the above-described two-motor mode is set is in an on state (step S1). The two-motor mode is selected when the required driving force and the vehicle speed fall within the two-motor mode region A2M shown in FIG. 6, and the two-motor flag F2M is a flag that is set to the on state as a result of the selection.

When the flag F2M is in the on state as a result of the fact that the two-motor mode corresponding to the motor driven state according to the invention is selected, affirmative determination is made in step S1. In this case, the process proceeds to step S2, and a flag (hereinafter, temporarily referred to as continuation flag) F2M-C indicating that the two-motor mode is continuing is set to an on state. The continuation flag F2M-C is a flag for executing the process of determining whether a temporal intermission of the two-motor mode is treated as a continuation of the two-motor mode or treated as an end of the two-motor mode. After the continuation flag F2M-C is set to the on state, an on timer Time_ON is counted (step S3). Specifically, an execution time Δtime of one cycle of the routine shown in FIG. 1A and FIG. 1B is added to a value (last value) Time_ON_old of the on timer Time_ON in the case where the routine shown in FIG. 1A and FIG. 1B is executed last time. The last value Time_ON_old just after the continuation flag F2M-C switches to the on state is zero, and measuring of a time is started in this case.

On the other hand, when negative determination is made in step S1 as a result of the fact that the two-motor flag F2M is in an off state, an off timer Time_OFF is counted (step S4). The off timer Time_OFF is used to measure an elapsed time from when the two-motor mode ends and the two-motor flag F2M is set to the off state. Specifically, the execution time Δtime of one cycle of the routine shown in FIG. 1A and FIG. 1B is added to the value (last value) Time_OFF_old of the off timer Time_OFF in the case where the routine shown in FIG. 1A and FIG. 1B is executed last time. The last value Time_OFF_old just after the two-motor flag F2M switches to the off state is zero, and measuring of a time is started in this case.

It is determined whether the thus measured time (the value of the off timer Time_OFF) is larger than a predetermined threshold Time_OFF_th (step S5). This threshold Time_OFF_th is a value for determining whether an elapsed time (that is, a duration of the state where the motor driven state is ended) after the drive mode switches from the two-motor mode to the drive mode other than the two-motor mode is a sufficient time to substantially start cooling of the above-described pinion gears 7, the pinion pins on which the pinion gears 7 are mounted, and the like. Therefore, this threshold Time_OFF_th may be determined in advance by design on the basis of an experiment, or the like, for each model of the hybrid vehicle or each model of the hybrid drive system. When negative determination is made in step S5 as a result of the fact that the elapsed time Time_OFF from when the two-motor flag F2M is set to the off state is shorter than or equal to the threshold Time_OFF_th, the process proceeds to the above-described step S2, and the continuation flag F2M-C is set to the on state. In contrast, when affirmative determination is made in step S5, the continuation flag F2M-C is set to the off state (step S6). That is, even when the two-motor mode ends, while the elapsed time after the end is shorter than the threshold Time_OFF_th, it is assumed that the two-motor mode is continued in terms of control. Therefore, in the control example shown in FIG. 1A and FIG. 1B, a temporal intermission of the two-motor mode is not treated as an end of the two-motor mode.

After step S3 or step S6, it is determined whether the continuation flag F2M-C is in the on state (step S7). This determination is, in short, to determine whether it is in a state where the temperature of the pinion gears 7, the pinion pins, and the like, rises because of the fact that the carrier 8 is stopped and the first motor 2 is outputting torque. Therefore, when negative determination is made in step S7, the process proceeds to a sub-routine SR for executing control in process in which the temperature of the pinion gears 7, the pinion pins, and the like, decreases. The sub-routine SR will be described later.

In contrast, when affirmative determination is made in step S7, it is determined whether the continuation flag F2M-C_old at that time is in the off state (step S8). In other words, it is determined whether the continuation flag F2M-C has been set to the off state in the last execution cycle of the routine shown in FIG. 1A and FIG. 1B. Because the continuation flag F2M-C is set to the on state in step S2 previous to step S8, when affirmative determination is made in step S8, it means that the drive mode has just switched to the two-motor mode. On the contrary, when negative determination is made in step S8, it means that the drive mode has already switched to the two-motor mode and the two-motor mode is continuing.

When affirmative determination is made in step S8 as a result of the fact that the drive mode has just switched to the two-motor mode, it is determined whether the ignition switch (IG_old) of the hybrid vehicle at the time of last execution of the routine shown in FIG. 1A and FIG. 1B is in the on state (step S9). This step S9 is, in short, a step of determining whether the hybrid vehicle has been already started up. When affirmative determination is made in step S9 as a result of the fact that the hybrid vehicle has been already started up, it is determined whether a last value Tp_est_old of a temperature (hereinafter, referred to as pinion temperature) Tp_est of the pinion gears 7, the pinion pins, and the like, is lower than or equal to a predetermined reference temperature Tpa (step S10). By inputting a nominal value as the pinion temperature Tp_est at the time of factory shipment of the hybrid vehicle, it is possible to determine the last value Tp_est_old. The reference temperature Tpa is a temperature determined by design, and defines a lower limit value of the pinion temperature Tp_est at the time of the start of control. The pinion temperature Tp_est is an estimated temperature. When the estimated temperature is excessively lower than an actual temperature, there is a possibility that the pinion temperature Tp_est that rises in the two-motor mode is estimated as a lower temperature. The reference temperature Tpa is set in order to avoid or suppress estimation to such a lower temperature. Therefore, when affirmative determination is made in step S10 as a result of the fact that the last value Tp_est_old of the pinion temperature Tp_est is lower than or equal to the reference temperature Tpa, the reference temperature Tpa is employed as the pinion temperature Tp_est (step S11). In this case, as will be described later, the pinion temperature is obtained by adding the amount of rise in the temperature to the reference temperature. On the contrary, when negative determination is made in step S10 as a result of the fact that the last value Tp_est_old of the pinion temperature Tp_est exceeds the reference temperature Tpa, the last value Tp_est_old is employed as the pinion temperature Tp_est (step S12). In this case, as will be described later, the pinion temperature is obtained by adding the amount of rise in the temperature to the last value Tp_est_old.

When negative determination is made in step S9 as a result of the fact that the hybrid vehicle has been just started, an initial pinion temperature Tp_est (a temperature corresponding to an initial temperature according to the embodiment of the invention) at which the two-motor mode is started is calculated (step S13) When the ignition switch is in the off state, there is no factor that raises the pinion temperature Tp_est, and the pinion temperature Tp_est has a decreasing tendency, so the pinion temperature Tp_est is decreased with a lapse of time ΔIG-OFF on the assumption that the temperature decreases at a predetermined rate of decrease ΔTp_down.

On the other hand, when negative determination is made in step S8, that is, when the continuation flag F2M-C is already in the on state, because the pinion temperature Tp_est has a rising tendency, the pinion temperature Tp_est is raised with a lapse of time Δtime on the assumption that the pinion temperature Tp_est rises at a predetermined rate of rise ΔTp_up (step S14). That is, a temperature obtained by adding the last value Tp_est_old to the product of the rate of rise ΔTp_up and the time Δtime is obtained as an estimated value of the pinion temperature Tp_est. The time Δtime is the execution time of one cycle of the routine shown in FIG. 1A and FIG. 1B.

Figure 7:
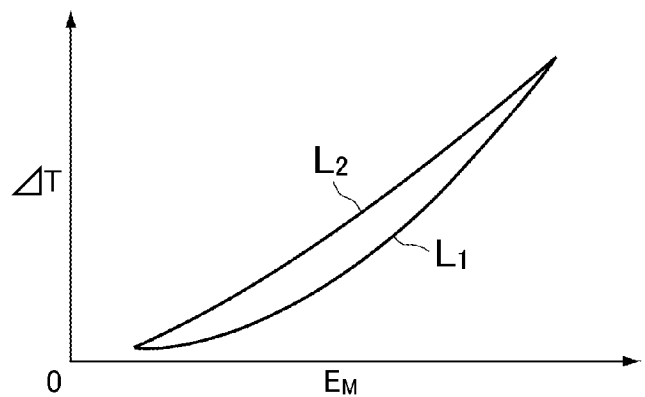
FIG. 7 is a graph that schematically shows measured results of the correlation between a power that a first motor outputs or an energy amount that is input to a power split mechanism and a rate of change in pinion temperature.

The above-described rate of decrease ΔTp_down and rate or rise ΔTp_up will be described. In the two-motor mode corresponding to the motor driven state according to the embodiment of the invention, power output from the first motor 2 is input to the power split mechanism 4, and heat is generated commensurately with the input power. The inventors measured the correlation between the power output from the first motor 2 in the two-motor mode and a variation per unit time (rate of change in temperature) in the temperature of the pinion gears 7, the pinion pins, and the like (hereinafter, temporarily referred to as pinion temperature). FIG. 7 schematically shows the measured results. In FIG. 7, the line L1 indicates measured values in the case where the temperature of lubricating oil is set so as to be lower than that in the example indicated by the line L2. It is found from the measured results shown in FIG. 7 that a rate of change (rate of rise) ΔT in pinion temperature increases as the output energy of the first motor 2 or an energy EM that is input to the power split mechanism 4 increases. This is presumably because the amount of energy that is converted to heat is large. It is also found that as the temperature of lubricating oil that is supplied to the power split mechanism 4 decreases, the rate of change (rate of rise) ΔT in pinion temperature decreases. This is conceivably because, as the difference between the pinion temperature and the oil temperature increases, heat radiation is more facilitated.

Figure 8:
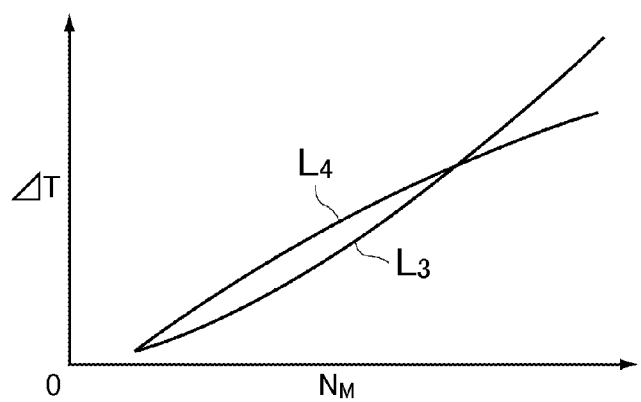
FIG. 8 is a graph that schematically shows measured results of the correlation between a rotation speed of the first motor and a rate of change in pinion temperature.

The inventors measured the correlation between the rotation speed NM of the first motor 2 and the rate of change ΔT in pinion temperature in the two-motor mode. FIG. 8 schematically shows the measured results. In FIG. 8, the line L3 indicates measured values in the case where the temperature of lubricating oil is set so as to be lower than that in the example indicated by the line L4. It is found from the measured results shown in FIG. 8 that the rate of change (rate of rise) ΔT in pinion temperature increases as the rotation speed NM of the first motor 2 increases, and the rate of change (rate of rise) ΔT in pinion temperature reduces as the temperature of lubricating oil that is supplied to the power split mechanism 4 decreases. It is also found that the effect of suppressing the rate of change ΔT due to a low lubricating oil temperature decreases with an increase in rotation speed. This is presumably because, as the rotation speed increases, the amount of lubricating oil dipped increases and the action of decreasing the pinion temperature increases. That is, as the amount of lubricating oil dipped increases, the rate of rise in pinion temperature is suppressed in the two-motor mode, and the rate of decrease in pinion temperature increases in the drive mode other than the two-motor mode.

Figure 9:
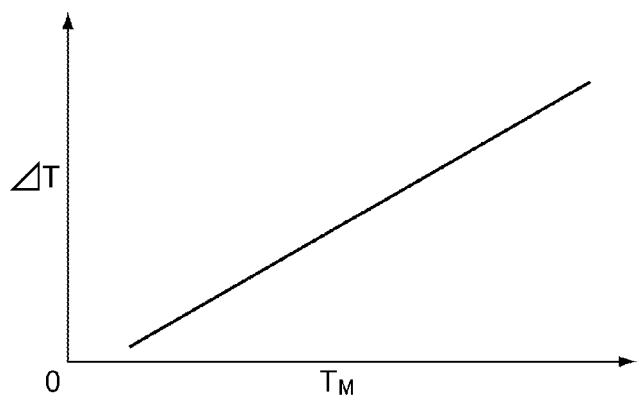
FIG. 9 is a graph that schematically shows measured results of the correlation between a torque of the first motor and a rate of change in pinion temperature.

The inventors further measured the correlation between the torque TM of the first motor 2 and the rate of change ΔT in pinion temperature in the two-motor mode. FIG. 9 schematically shows the measured results. It is found from the measured results shown in FIG. 9 that the rate of change (rate of rise) ΔT in pinion temperature increases as the torque TM of the first motor 2 increases.

Figure 10:
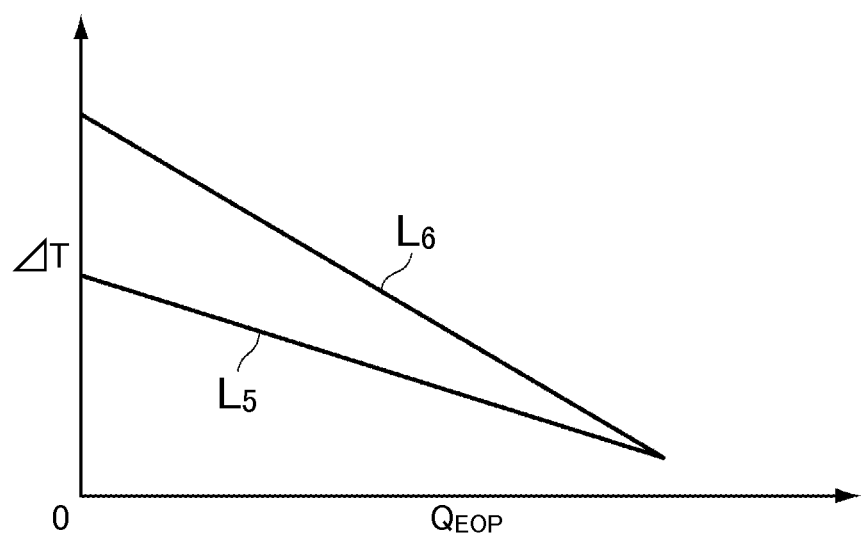
FIG. 10 is a graph that schematically shows measured results of the correlation between a discharge oil amount of an EOP and a rate of change in pinion temperature.

The inventors further measured the rate of change ΔT in pinion temperature while changing the discharge oil amount QEOP of the EOP 14 in the two-motor mode. FIG. 10 schematically shows the results. The measured results in the case of a low vehicle speed at a high torque are indicated by the line L5, and the measured results in the case of a high vehicle speed at a low torque are indicated by the line L6. In any cases, the pinion temperature decreased with an increase in the discharge oil amount of the EOP 14, and the pinion temperature significantly decreased with an increase in the vehicle speed or with an increase in the rotation speed of the first motor 2. It is found from the measured results that, when the discharge oil amount of the EOP 14 is increased, the rate of rise ΔTp_up in pinion temperature in the two-motor mode is suppressed, and the rate of decrease ΔTp_down in pinion temperature in the drive mode other than the two-motor mode is increased.

Figure 11:
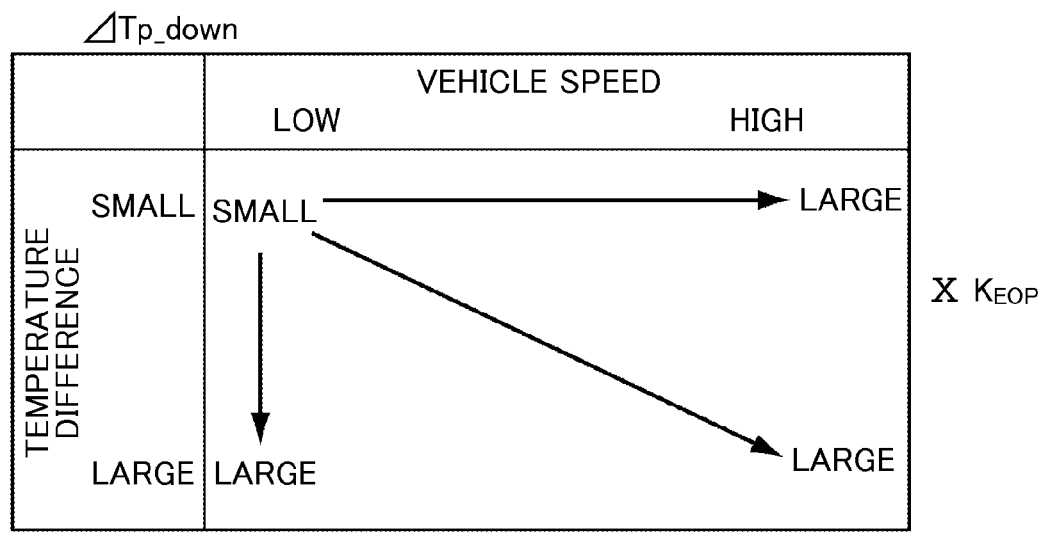
FIG. 11 is a view that shows an example of a map of a rate of decrease, which is used in the control.

From these measured results shown in FIG. 7 to FIG. 10, it may be determined that the rate of change (rate of decrease) ΔTp_down in pinion temperature increases as heat radiated from the pinion gears 7, and the like, is facilitated like, for example, the amount of lubricating oil dipped increases or the temperature of lubricating oil decreases. It is presumable that heat radiation from the pinion gears 7, and the like, mainly occurs as a result of removal of heat from the pinion gears 7, and the like, by lubricating oil, so the factors of heat radiation (heat radiation factors) are a temperature difference between the pinion temperature Tp_est and the oil temperature, the vehicle speed related to the amount of oil dipped by the pinion gears 7, and the like, the discharge oil amount of the EOP 14, and the like. That is, as the temperature difference increases, the rate of decrease ΔTp_down increases, and, as the vehicle speed increases, the amount of oil increases and the rate of decrease ΔTp_down increases. When the EOP 14 is operating, the discharge oil amount increases and the rate of decrease ΔTp_down increases. Therefore, the rate of decrease ΔTp_down may be prepared as a map that uses these heat radiation factors as parameters, and an example of the map is shown in FIG. 11. In the example shown in FIG. 11, the value related to the EOP 14 is a correction coefficient KEOP. The correction coefficient KEOP is set such that the rate of decrease ΔTp_down in the case where the discharge oil amount of the EOP 14 is large is larger than the rate of decrease ΔTp_down in the case where the discharge oil amount of the EOP 14 is small. FIG. 11 shows the correlation between the temperature difference or vehicle speed and the rate of decrease ΔTp_down. The value of an actual rate of change ΔTp_down is influenced by the performance of an oil cooler (not shown) in an actual machine, the shape of a rotating member, such as a gear, that dips lubricating oil, whether there is a protrusion in a route through which lubricating oil reaches the pinion gears 7, and the like, the number of the protrusions, and the like, so the rate of decrease ΔTp_down is obtained in advance by an experiment, or the like, on an actual machine. In addition, the above-described time ΔIG-OFF should be measured by a predetermined timer.

Figure 12:
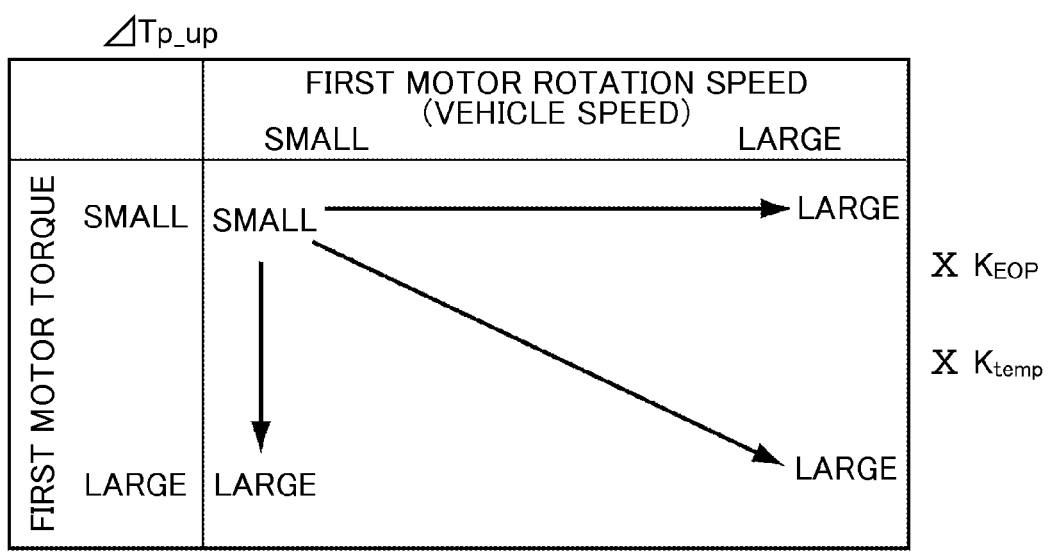
FIG. 12 is a view that shows an example of a map of a rate of increase, which is used in the control.

On the other hand, the rate of rise ΔTp_up in pinion temperature will be described. From the above-described measured results, it may be understood that the pinion temperature Tp_est changes with a difference between the amount of heat generated due to energy loss and the amount of heat removed by mainly lubricating oil. Factors of the heat generation (heat generation factors) are an energy that is input to the power split mechanism 4, the torque or rotation speed of the first motor 2, and the like. In contrast, factors of heat radiation (heat radiation factors) are the above-described temperature difference between the pinion temperature Tp_est and the oil temperature (or the oil temperature), the vehicle speed (or the rotation speed of the first motor 2) related to the amount of oil dipped by the pinion gears 7, and the like, the discharge oil amount of the EOP 14, and the like. Among these factors, it is presumable that the influence due to the energy that is input to the power split mechanism 4 is the largest, so the rate of rise ΔTp_up increases as the amount of energy (that is, the torque and rotation speed of the first motor 2) increases. Therefore, the rate of rise ΔTp_up may be prepared as a map that uses these heat generation factors and heat radiation factors as parameters, and an example of the map is shown in FIG. 12. As shown in FIG. 12, the rate of rise ΔTp_up is set so as to be a larger value as the torque of the first motor 2 increases or as the rotation speed of the first motor 2 increases. As the rotation speed of the first motor 2 (that is, the vehicle speed) increases, the amount of lubricating oil dipped increases and, as a result, the amount of heat radiation increases, so the influence of an increase in the rotation speed of the first motor 2 to increase the rate of rise ΔTp_up is smaller than the influence of an increase in the torque of the first motor 2.

In the example shown in FIG. 12, a reference value is obtained on the basis of the torque and rotation speed of the first motor 2, and the rate of rise ΔTp_up is obtained by correcting the reference value with the correction coefficient KEOP related to the EOP 14 and a correction coefficient Ktemp related to the oil temperature. The correction coefficient Ktemp related to the oil temperature is set such that the rate of rise ΔTp_up decreases as the oil temperature decreases. FIG. 12 shows the correlation between the torque or rotation speed of the first motor 2 and the rate of rise ΔTp_up. The value of an actual rate of rise ΔTp_up, as in the case of the example of the above-described rate of decrease ΔTp_down, is significantly influenced by the structure of the hybrid drive system, so the rate of rise ΔTp_up is obtained in advance by an experiment, or the like, on an actual machine.

After the pinion temperature Tp_est (estimated value) is obtained in any one of steps S11 to S14, it is determined whether the pinion temperature Tp_est is higher than or equal to an upper limit temperature Tp_th (step S15). The upper limit temperature Tp_th is a temperature determined by design in consideration of the durability, and the like, of the pinion gears 7, the pinion pins, the bearings of the pinion pins and lubricating oil. The upper limit temperature Tp_th corresponds to a first threshold according to the embodiment of the invention. When negative determination is made in step S15 as a result of the fact that the pinion temperature Tp_est is lower than the upper limit temperature Tp_th, an inhibition flag F2M_inh is kept in the off state (step S16), and then the routine shown in FIG. 1A and FIG. 1B is once ended. That is, the two-motor mode is allowed, and, when the two-motor mode is already set, the two-motor mode is continued. In this case, because it is estimated that the temperature of the pinion gears 7, the pinion pins, and the like, is still low, a decrease in the durability of the pinion gears 7, the pinion pins, and the like, is avoided or suppressed.

In contrast, when affirmative determination is made in step S15 as a result of the fact that the estimated pinion temperature Tp_est is higher than or equal to the upper limit temperature Tp_th, the two-motor mode is allowed or inhibited in response to the duration of the motor driven state. That is, it is determined whether the value of the above-described on timer Time_ON is shorter than or equal to a predetermined reference value τon corresponding to a first reference time according to the embodiment of the invention (step S17). The reference value τon is used to determine whether there is an error in estimation of the pinion temperature Tp_est, and is obtained in advance by an experiment on an actual machine, simulation, or the like. That is, the temperature of the power split mechanism 4, such as the pinion gears 7, rises commensurately with a difference between the above-described heat generation factors and heat radiation factors. The rate of rise in the temperature substantially depends on the difference between those factors. Therefore, a time that takes for the actual temperature of the pinion gears 7, the pinion pins, and the like, to reach the above-described upper limit temperature Tp_th does not become shorter than a time that is determined from the rate of rise based on the difference between those factors. The reference value τon is a time that is determined on the basis of the rate of rise, which cannot occur under normal conditions. The reference value τon does not need to be a constant value, and may be a variable based on the above-described heat generation factors or heat radiation factors, that is, the output torque of the first motor 2, the vehicle speed, or the like.

When affirmative determination is made in step S17, it means that the pinion temperature Tp_est has reached the upper limit temperature Tp_th in a short elapsed time. Such a situation does not occur under normal conditions, so it is presumable that there is an error in estimation of the pinion temperature Tp_est. Therefore, when affirmative determination is made in step S17, the process proceeds to step S16, and the inhibition flag F2M_inh is kept in the off state, and then the routine shown in FIG. 1A and FIG. 1B is once ended. That is, the two-motor mode is allowed, and, when the two-motor mode is already set, the two-motor mode is continued. As a result, a period or an opportunity to execute the two-motor mode is difficult to be limited, so it is possible to improve the fuel economy of the hybrid vehicle.

On the other hand, when negative determination is made in step S17, it is presumable that there is no error in estimation of the pinion temperature Tp_est. Therefore, in this case, the two-motor flag F2M is set to the off state (step S18), and the two-motor mode corresponding to the motor driven state according to the embodiment of the invention is ended. In this case, the HV mode or the one-motor mode is set in response to the vehicle speed, the accelerator operation amount, and the like. The inhibition flag F2M_inh that inhibits the two-motor mode is set to the on state (step S19), and then the routine shown in FIG. 1A and FIG. 1B is once ended. That is, the two-motor mode is inhibited.

Next, control that is executed in the case where negative determination is made in step S7 as a result of the fact that that continuation flag F2M-C is in the off state will be described. It is determined whether the already obtained pinion temperature Tp_est_old (last value) is lower than or equal to the above-described reference temperature Tpa (step S20). This is similar determination control to that of step S10. When affirmative determination is made in step S20, the reference temperature Tpa is employed as the pinion temperature Tp_est (step S21). On the contrary, when negative determination is made in step S20 as a result of the fact that the last value Tp_est_old of the pinion temperature Tp_est exceeds the reference temperature Tpa, the pinion temperature Tp_est decreased from the last value Tp_est_old is obtained (step S22). When the drive mode other than the two-motor mode is set, the carrier 8 in the power split mechanism 4 rotates and a sufficient amount of lubricating oil is supplied to the power split mechanism 4, so the pinion temperature Tp_est is obtained on the assumption that the pinion temperature decreases at the predetermined rate of decrease $\Delta$Tp_down in the temperature.

The above-described rate of decrease $\Delta$Tp_down will be described. In the one-motor mode or the HV mode, which corresponds to the state where the motor driven state is ended according to the embodiment of the invention, the second motor 3 is outputting driving force for propelling the hybrid vehicle, so the ring gear 6 in the power split mechanism 4 is rotated. Therefore, the ring gear 6 actively dips lubricating oil. On the other hand, the engine 1 and the carrier 8 coupled to the engine 1 are not rotating. The engine 1 and the first motor 2 are not outputting large torque, such as driving torque for propelling the hybrid vehicle. Therefore, in the power split mechanism 4, the ring gear 6 is rotating, but no large load is exerted, and the ring gear 6 actively dips lubricating oil in this state, so the power split mechanism 4 is cooled by lubricating oil. The amount of the lubricating oil increases with an increase in the rotation speed of the ring gear 6, that is, the vehicle speed.

In the HV mode, the torque of the engine 1 is transmitted to the carrier 8 and the carrier 8 rotates, and the torque of the first motor 2 is transmitted to the sun gear 5 and the sun gear 5 rotates. Therefore, the rotating elements rotate to actively supply lubricating oil to the power split mechanism 4. In this case, the power split mechanism 4 functions to distribute power, input from the engine 1, to the ring gear 6 side and the first motor 2 side, and does not function as a speed reducer. That is, a load on the power split mechanism 4 is smaller than that in the case where the power split mechanism 4 functions as a speed reducer. Therefore, the amount of heat cooled by lubricating oil (the amount of heat radiation) with respect to the amount of heat generation increases, and the pinion gears 7, the pinion pins, and the like, are cooled.

Figure 13:
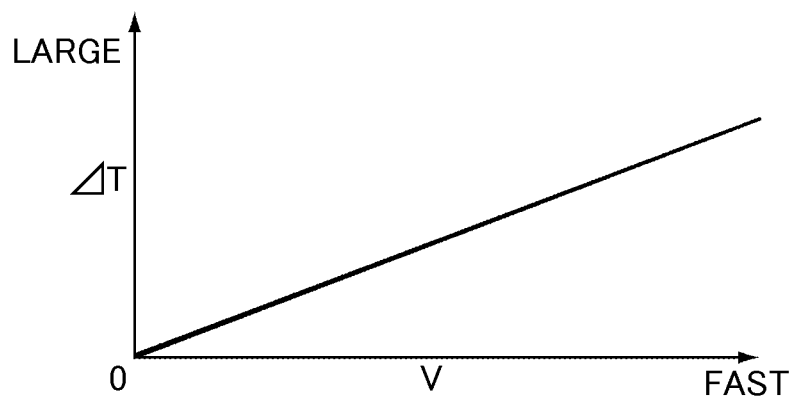
FIG. 13 is a graph that schematically shows measured results of the correlation between a rate of decrease in pinion temperature and a vehicle speed.
Figure 14:
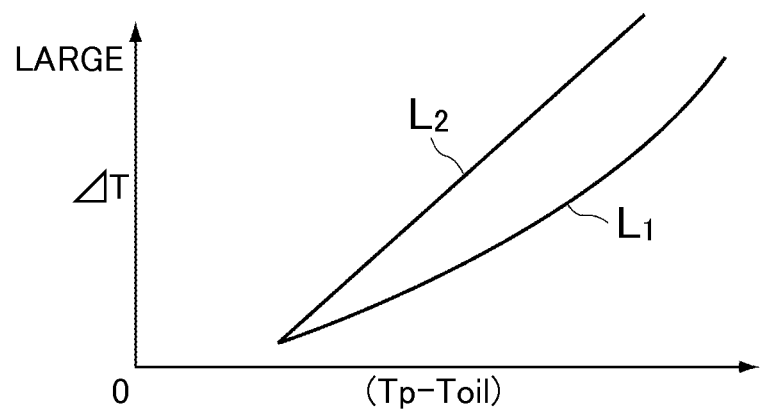
FIG. 14 is a graph that schematically shows measured results of the correlation between a temperature difference between a pinion temperature and an oil temperature and a rate of decrease in pinion temperature.

The inventors measured the correlation between the rate of change $\Delta$T (rate of decrease $\Delta$Tp_down: a decrease in temperature per unit time) in the pinion temperature Tp_est and the vehicle speed V in the HV mode or the one-motor mode. FIG. 13 schematically shows the measured results. As shown by the measured results in FIG. 13, the rate of change $\Delta$T (rate of decrease $\Delta$Tp_down) in the pinion temperature Tp_est increases with an increase in the vehicle speed V. The pinion gears 7, the pinion pins, and the like, are cooled by removing heat by the use of lubricating oil, so the correlation between a temperature difference (Tp−Toil) between a temperature Tp, such as the pinion gears 7, the pinion pins, and the like, and a temperature Toil of lubricating oil and a rate of change $\Delta$T (rate of decrease $\Delta$Tp_down) in the pinion temperature Tp_est while the accelerator is released. FIG. 14 schematically shows the measured results. In FIG. 14, the line L2 indicates measured results in the case where the amount of lubricating oil supplied is increased by driving the EOP 14 as compared to that in the case indicated by the line L1. As shown by the measured results in FIG. 14, as the temperature Toil of lubricating oil is decreased, the rate of change $\Delta$T (rate of decrease $\Delta$Tp_down) in the pinion temperature Tp_est increases; as the amount of lubricating oil increases, the rate of change $\Delta$T (rate of decrease $\Delta$Tp_down) in the pinion temperature Tp_est increases.

From these measured results shown in FIG. 13 and FIG. 14, it may be determined that the rate of change $\Delta$T (rate of decrease $\Delta$Tp_down) in pinion temperature increases as heat radiated from the pinion gears 7, and the like, is facilitated like, for example, the amount of lubricating oil dipped increases or the temperature of lubricating oil decreases. It is presumable that heat radiation from the pinion gears 7, and the like, mainly occurs as a result of removal of heat from the pinion gears 7, and the like, by lubricating oil, so the factors of heat radiation (heat radiation factors) are a temperature difference between the pinion temperature Tp_est and the oil temperature, the vehicle speed related to the amount of oil dipped by the pinion gears 7, and the like, the discharge oil amount of the EOP 14, and the like. That is, as the temperature difference increases, the rate of decrease $\Delta$Tp_down increases, and, as the vehicle speed increases, the amount of oil increases and the rate of decrease $\Delta$Tp_down increases. When the EOP 14 is operating, the discharge oil amount increases and the rate of decrease $\Delta$Tp_down increases. Therefore, the rate of decrease $\Delta$Tp_down may be prepared as a map that uses these heat radiation factors as parameters. The value of an actual rate of change $\Delta$Tp_down is influenced by the performance of an oil cooler (not shown) in an actual machine, the shape of a rotating member, such as a gear, that dips lubricating oil, whether there is a protrusion in a route through which lubricating oil reaches the pinion gears 7, and the like, the number of the protrusions, and the like, so the rate of decrease $\Delta$Tp_down is obtained in advance by an experiment, or the like, on an actual machine.

After the pinion temperature Tp_est is estimated in one of step S21 and step S22, it is determined whether the pinion temperature Tp_est is lower than or equal to an allowable temperature Tpb (step S23). The allowable temperature Tpb is a temperature higher than the above-described reference temperature Tpa, and is a temperature close to a temperature at which the two-motor mode should be inhibited. The allowable temperature Tpb corresponds to a second threshold according to the embodiment of the invention. That is, even when the two-motor mode ends and the pinion temperature Tp_est is decreasing, but when the pinion temperature Tp_est is a temperature close to a predetermined so-called inhibition temperature at which the two-motor mode should be inhibited, there is a possibility that the pinion temperature Tp_est immediately reaches the inhibition temperature by resuming the two-motor mode, and then exceeds the inhibition temperature. In order to avoid such a situation, the allowable temperature Tpb is set, and the two-motor mode is allowed to be continued for a certain time in the case where the two-motor mode is resumed.

Therefore, when affirmative determination is made in step S23 as a result of the fact that the pinion temperature Tp_est is lower than or equal to the allowable temperature Tpb, the inhibition flag F2M_inh for inhibiting the two-motor mode is set to the off state (step S24), and then the routine shown in FIG. 1A and FIG. 1B is once ended. That is, the two-motor mode is allowed.

On the contrary, when negative determination is made in step S23 as a result of the fact that the pinion temperature Tp_est exceeds the allowable temperature Tpb, the two-motor mode is allowed or inhibited in response to the duration of the state where the motor driven state is ended according to the embodiment of the invention. That is, it is determined whether the off timer Time_OFF that is an elapsed time from the end of the two-motor mode is longer than or equal to a predetermined reference value τoff corresponding to a second reference time according to the embodiment of the invention (step S25). The reference value τoff is used to determine whether there is an error in estimation of the pinion temperature Tp_est, and is obtained in advance by an experiment on an actual machine, simulation, or the like. That is, in the state where the motor driven state is ended, the temperature of the power split mechanism 4, such as the pinion gears 7, decreases commensurately with mainly the above-described-heat radiation factors. The rate of decrease substantially depends on the heat radiation factors. Therefore, a time that takes for the actual temperature of the pinion gears 7, the pinion pins, and the like, to reach the above-described allowable temperature Tpb does not become longer than a time that is determined from the rate of decrease based on the heat radiation factors. The allowable temperature Tpb is a time that is determined on the basis of the rate of decrease, which cannot occur under normal conditions. The allowable temperature Tpb does not need to be a constant value, and may be a variable based on the above-described heat radiation factors or heat generation factors in addition to the heat radiation factors, that is, the output torque of the first motor 2, the vehicle speed, or the like.

When affirmative determination is made in step S25, it means that the pinion temperature Tp_est that is the estimated value decreases to the allowable temperature Tpb over an excessively long time. Such a situation does not occur under normal conditions, so it is presumable that there is an error in estimation of the pinion temperature Tp_est. Therefore, when affirmative determination is made in step S25, the process proceeds to step S24, and the inhibition flag F2M_inh is set to the off state, and then the routine shown in FIG. 1A and FIG. 1B is once ended. That is, the two-motor mode is allowed. As a result, resumption of the two-motor mode is difficult to be excessively delayed or a period or an opportunity to execute the two-motor mode is difficult to be limited accordingly, so it is possible to improve the fuel economy of the hybrid vehicle.

On the other hand, when negative determination is made in step S25, it is presumable that there is no error in estimation of the pinion temperature Tp_est. Therefore, in this case, the inhibition flag F2M_inh is set to the on state (step S26), and then the routine shown in FIG. 1A and FIG. 1B is once ended. That is, there is no error in estimation of the temperature and the pinion temperature Tp_est is estimated to be higher than the allowable temperature Tpb, so the two-motor mode corresponding to the motor driven state according to the embodiment of the invention is inhibited.

Figure 2:
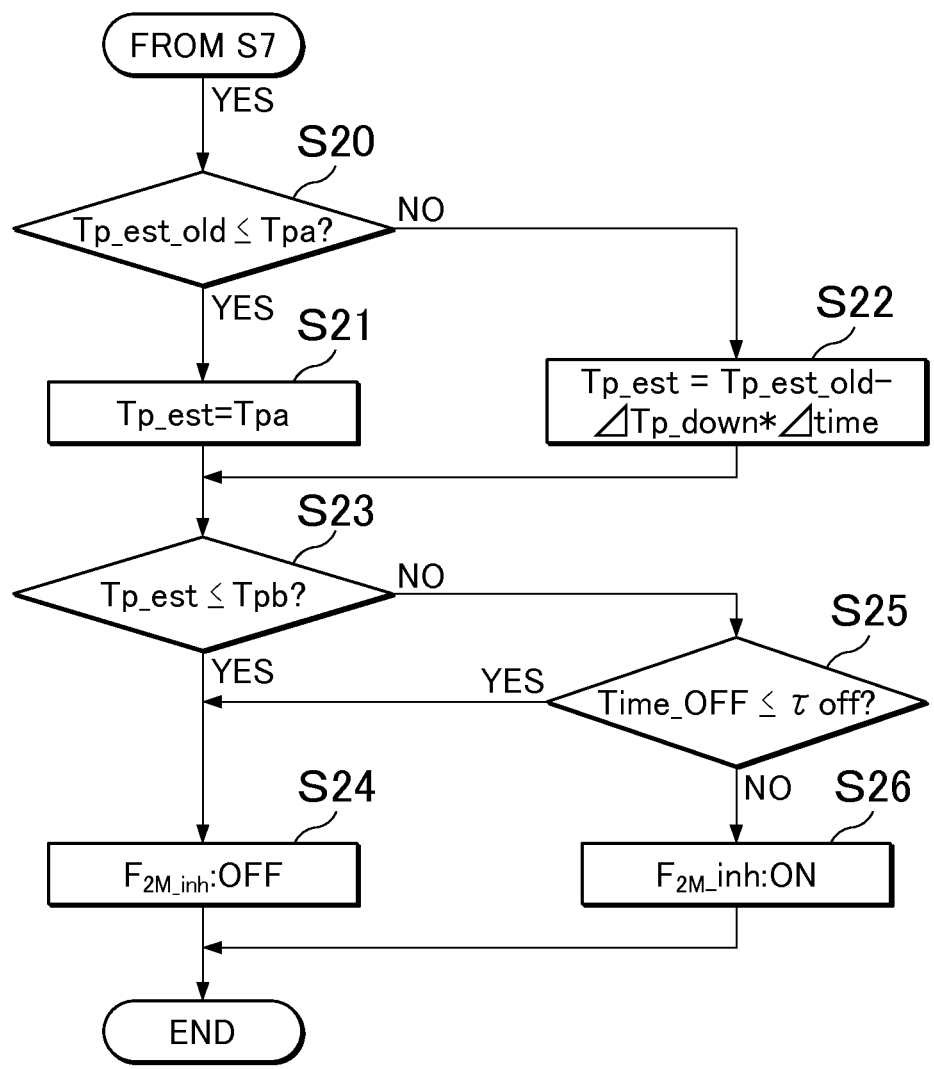
FIG. 2 is a flowchart for illustrating an example of control in process in which the pinion temperature decreases within the control that is executed by the controller in the control system according to the invention.

In the routines shown in FIG. 1A, FIG. 1B and FIG. 2, the values of the timers Time_ON, Time_OFF should be reset to zero as needed. For example, when affirmative determination is made in step S7, the off timer Time_OFF may be reset to zero; when negative determination is made in step S7, the on timer Time_ON may be reset to zero.

A change between permission and inhibition in the case where the above-described control is executed will be described as follows with reference to the drawings. FIG. 3 schematically shows an example in which the two-motor mode is allowed and the pinion temperature Tp_est is rising. The continuous line shows a change in the pinion temperature Tp_est in a state where estimation of the pinion temperature Tp_est is normal. The broken line shows a change in the pinion temperature Tp_est in the case where there arises an abnormality in estimation of the pinion temperature Tp_est and the estimated value is high. When there is an abnormality in estimation of the pinion temperature Tp_est, the time Time_ON that takes until the estimated value reaches the upper limit temperature Tp_th is shorter than the reference time τon. At this time, affirmative determination is made in step S17, so the two-motor mode is allowed and the operation in the two-motor mode is continued. When the time Time_ON during which the two-motor mode is continued exceeds the reference time τon, negative determination is made in step S17, and the two-motor mode is inhibited. That is, in comparison with the case where inhibition determination is carried out on the basis of the estimated value of the pinion temperature Tp_est, the timing of inhibiting the two-motor mode delays, so a period or an opportunity to execute the two-motor mode increases.

FIG. 4 schematically shows an example in which the two-motor mode is inhibited and the pinion temperature Tp_est is decreasing. The continuous line shows a change in the pinion temperature Tp_est in a state where estimation of the pinion temperature Tp_est is normal. The broken line shows a change in the pinion temperature Tp_est in the case where there arises an abnormality in estimation of the pinion temperature Tp_est and the estimated value is high. When there is an abnormality in estimation of the pinion temperature Tp_est, even when the duration Time_OFF of the state where the two-motor mode is inhibited reaches the reference time τoff, the estimated value is higher than the allowable temperature Tpb. At this time, affirmative determination is made in step S25, and the two-motor mode is allowed. That is, in comparison with the case where permission determination is carried out on the basis of the estimated value of the pinion temperature Tp_est, the timing of allowing the two-motor mode advances, so a period or an opportunity to execute the two-motor mode increases.

With the drive control system according to the invention, when there is an abnormality in estimation of the pinion temperature Tp_est, abnormal estimation of the pinion temperature Tp_est is complemented by the duration Time_ON of the two-motor mode or the duration Time_OFF of the state where the two-motor mode is not executed, so it is possible to improve fuel economy by increasing a period or an opportunity to execute the two-motor mode that is the drive mode in which electric power is used. Because the two-motor mode is allowed within the range in which the pinion temperature Tp_est does not become excessively high, it is possible to improve the durability of the power split mechanism 4 or the durability of the pinion gears 7, the pinion pin, and the like.

In the above-described specific example, the example in which the power split mechanism is formed of the single-pinion planetary gear mechanism is described. Instead, the invention is applicable to an example in which the power split mechanism is formed of a double-pinion planetary gear mechanism. The hybrid vehicle to which the invention is applicable just needs to be, in short, configured to cause the power split mechanism to function as a speed reducer for the first motor by fixing the carrier of the power split mechanism.

What is claimed is:

1. A drive control system for a hybrid vehicle, the drive control system comprising:
   a power split mechanism including a carrier, a sun gear and a ring gear as rotating elements, the power split mechanism being configured to carry out differential action, an engine torque from an engine being transmitted to the carrier;
   a brake mechanism configured to selectively stop rotation of the carrier;
   a first motor coupled to one of the sun gear and the ring gear, the first motor being able to generate an electric power;
   an output member coupled to a second one of the sun gear and the ring gear which is not coupled to the first motor, wherein the output member outputs an output torque;
   a second motor configured to add a driving torque for propelling the hybrid vehicle to the output torque; and
   an electronic control unit configured to
      obtain at least one of a first time that is a duration of a motor driven state or a second time that is a duration of a state where the motor driven state is ended,
      estimate a temperature of the power split mechanism based on at least one of the first time or the second time,
      allow the motor driven state when any one of conditions i), ii), and iii) are satisfied:
         i) a first temperature is lower than a predetermined first threshold or when a second temperature is lower than a predetermined second threshold, the first temperature being a temperature of the power split mechanism, estimated based on the first time, the second temperature being a temperature of the power split mechanism, estimated based on the second time,
         ii) the first temperature is higher than or equal to the first threshold and the first time is shorter than or equal to a predetermined first reference time, and
         iii) the second temperature is higher than or equal to the second threshold and the second time is longer than or equal to a predetermined second reference time, and
      inhibit the motor driven state when either of conditions iv) and v) are satisfied:
         iv) the first temperature is higher than or equal to the first threshold and the first time exceeds the first reference time, and
         v) the second temperature is higher than or equal to the second threshold and the second time is shorter than the second reference time,
   wherein the motor driven state is a state in which rotation of the carrier is stopped by the brake mechanism, a torque output from the first motor is transmitted to the output member via the power split mechanism, and the second motor is outputting the driving torque.

2. The drive control system according to claim 1, wherein the electronic control unit is configured to, when there is a temporal intermission of the motor driven state and a time of the intermission is shorter than a predetermined time, keep determination that the motor driven state is established.

3. The drive control system according to claim 1, wherein the electronic control unit is configured to estimate the temperature of the power split mechanism based on the first time and a predetermined rate of rise in the temperature.

4. The drive control system according to claim 1, wherein the electronic control unit is configured to estimate the temperature of the power split mechanism based on the second time and a predetermined rate of decrease in the temperature.

* * * * *